US010170103B2

United States Patent
Fukuda

(10) Patent No.: US 10,170,103 B2
(45) Date of Patent: Jan. 1, 2019

(54) DISCRIMINATIVE TRAINING OF A FEATURE-SPACE TRANSFORM

(71) Applicant: INTERNATIONAL BUSINESS MACHINES CORPORATION, Armonk, NY (US)

(72) Inventor: Takashi Fukuda, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/004,413

(22) Filed: Jan. 22, 2016

(65) Prior Publication Data

US 2017/0213543 A1 Jul. 27, 2017

(51) Int. Cl.
*G10L 15/00* (2013.01)
*G10L 15/02* (2006.01)
*G10L 15/06* (2013.01)
*G10L 15/183* (2013.01)

(52) U.S. Cl.
CPC .......... *G10L 15/063* (2013.01); *G10L 15/183* (2013.01); *G10L 2015/0635* (2013.01)

(58) Field of Classification Search
CPC ................. G10L 15/063; G10L 15/183; G10L 2015/0631; G10L 2015/0633; G10L 2015/0635; G10L 2015/0636; G10L 2015/0638; G10L 15/065; G10L 15/07; G10L 15/075; G10L 15/142; G10L 15/144; G10L 15/1822; G10L 15/187; G10L 15/19; G10L 15/193; G10L 15/197; G10L 15/20
USPC ....................................... 704/243–255, 1–10
See application file for complete search history.

(56) References Cited

U.S. PATENT DOCUMENTS

| 8,374,866 | B2 | 2/2013 | Weinstein et al. |
| 8,583,432 | B1 * | 11/2013 | Biadsy .................. G10L 15/063 704/10 |
| 8,838,448 | B2 | 9/2014 | Jiang et al. |
| 8,965,763 | B1 | 2/2015 | Chelba et al. |
| 8,977,549 | B2 | 3/2015 | Deligne et al. |

(Continued)

OTHER PUBLICATIONS

Povey, D. et al., "FMPE: Discriminatively Trained Features for Speech Recognition," IEEE International Conference on Acoustics, Speech, and Signal Processing, vol. 1 Mar. 2005. (pp. 961-964).

(Continued)

*Primary Examiner* — Vincent Rudolph
*Assistant Examiner* — Stephen Brinich
(74) *Attorney, Agent, or Firm* — Tutunjian & Bitetto, P.C.; Vazken Alexanian

(57) ABSTRACT

A method, a system, and a computer program product are provided for discriminatively training a feature-space transform. The method includes performing feature-space discriminative training (f-DT) on an initialized feature-space transform, using manually transcribed data, to obtain a pre-stage trained feature-space transform. The method further includes performing f-DT on the pre-stage trained feature-space transform as a newly initialized feature-space transform, using automatically transcribed data, to obtain a main-stage trained feature-space transform. The method additionally includes performing f-DT on the main-stage trained feature-space transform as a newly initialized feature-space transform, using manually transcribed data, to obtain a post-stage trained feature-space transform.

20 Claims, 7 Drawing Sheets

(56) References Cited

U.S. PATENT DOCUMENTS

| 2011/0144991 | A1* | 6/2011 | Fousek | G10L 19/0212 |
| | | | | 704/243 |
| 2013/0268270 | A1* | 10/2013 | Jiang | G10L 15/07 |
| | | | | 704/236 |
| 2014/0164299 | A1 | 6/2014 | Sainath et al. | |
| 2015/0112669 | A1 | 4/2015 | Fukuda et al. | |

OTHER PUBLICATIONS

Stan, A. et al., "ALISA: An automatic lightly supervised speech segmentation and alignment tool," Computer Speech and Language, vol. 35, Jan. 2016, (pp. 116-133).

Yu, K. et al., "Unsupervised Training with Directed Manual Transcription for Recognising Mandarin Broadcast Audio," 8th Annual Conference of the International Speech Communication Association, Aug. 2007. (pp. 1-4).

* cited by examiner

Experiment-1

| | | Speech data set A improving rate (%) | Speech data set B improving rate (%) | Average improving rate (%) |
|---|---|---|---|---|
| A | Conventional f-DT | - | - | - |
| B | Pre-, Main- and Post-stages | 1.73 | 0.23 | 0.98 |
| C | Pre-, Main- and Post-stages with MAP and ML criterion update | 1.74 | 0.49 | 1.12 |

Experiment-2

| | | Training data of WLM | Speech data set A improving rate (%) | Speech data set B improving rate (%) | Average improving rate (%) |
|---|---|---|---|---|---|
| D | Conventional f-DT | 5K hours of automatically transcribed data | - | - | - |
| E | | 150 hours of manually transcribed data | 0.13 | 0.38 | 0.26 |
| F | Pre-, Main- and Post-stages of f-DT | 5K hours of automatically transcribed data | - | - | - |
| G | | 150 hours of manually transcribed data | 0.60 | -0.10 | 0.25 |

FIG. 3

DISCRIMINATIVE TRAINING OF A FEATURE-SPACE TRANSFORM

BACKGROUND

This invention relates generally to a feature space for a speech recognition system and, more especially to discriminatively training a feature-space transform.

A state of the art automatic speech recognition (ASR) system is usually trained with more than a few hundred speakers in a target domain to provide robustness. Since ASR performance is highly dependent on the acoustic environment in the target domain, an acoustic model (AM) in the system should ideally be built with a large amount of target domain data.

Modern auto speech recognition (ASR) systems are trained with a large amount of training data. There are two types of training data which can be used for training the ASR systems: one is manually transcribed data; and another is automatically transcribed data.

Manually-transcribed data can be used ideally for AM training. However, transcription of a big data by human involves enormous costs. Therefore, only a limited amount of field data is transcribed and is utilized for an AM training.

Automatically transcribed data are very effective and can be generated with less cost than manually-transcribed data because they complement speaker and environmental variations including speaking styles which are not in the transcribed data. There are several ways to generate high quality automatically transcribed data. However, they still include ASR (transcription) errors. The transcription errors are harmful for discriminative training (DT) techniques because the discriminative training techniques are based on a distance measure between recognition results and corresponding transcriptions.

If a reference text corresponding to each utterance contains errors, a part of statistics for DT is mistakenly accumulated and gives a negative impact.

SUMMARY

According to one aspect of the present invention, an embodiment of the present invention provides a computer-implemented method for discriminatively training a feature-space transform. The method comprises performing feature-space discriminative training (f-DT) on an initialized feature-space transform, using manually transcribed data, to obtain a pre-stage trained feature-space transform; performing f-DT on the pre-stage trained feature-space transform as a newly initialized feature-space transform, using automatically transcribed data, to obtain a main-stage trained feature-space transform; and performing f-DT on the main-stage trained feature-space transform as a newly initialized feature-space transform, using manually transcribed data, to obtain a post-stage trained feature-space transform. The method further may comprise training an initial acoustic model (AM), using a pre-stage transformed feature vector of manually transcribed data, to obtain a pre-stage trained AM, training the pre-stage trained AM, using a main-stage transformed feature vector of automatically transcribed data, to obtain a main-stage trained AM, and training the main-stage trained AM, using a post-stage transformed feature vector of manually transcribed data, to obtain a post-stage trained AM.

According to another aspect of the present invention, a system such as a computer system comprising a computer readable storage medium storing a program of instructions executable by the system to perform one or more methods described herein may be provided.

According to another aspect of the present invention, a computer program product comprising a computer readable storage medium storing a program of instructions executable by the system to perform one or more methods described herein also may be provided.

BRIEF DESCRIPTION OF THE DRAWINGS

The disclosure will provide details in the following description of preferred embodiments with reference to the following figures wherein:

FIG. 3 illustrates one embodiment of ASR experiment results; and

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
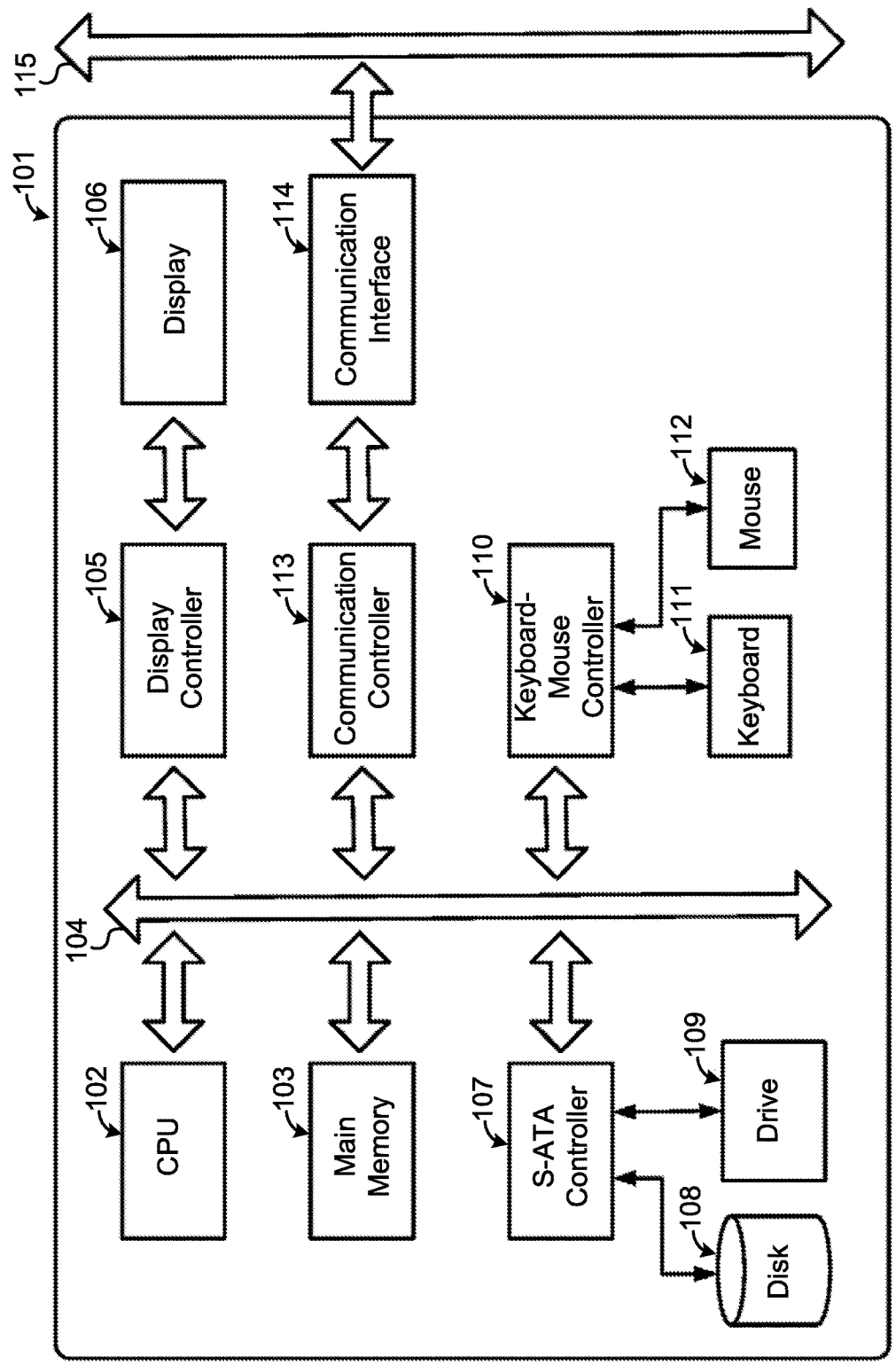
FIG. 1 illustrates an example of a basic block diagram of a computer hardware used in an embodiment of the present invention.

With reference now to FIG. 1, FIG. 1 illustrates an exemplified basic block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) may comprise one or more CPUs (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be described with reference to the following FIGS. 2A to 2D, FIG. 3 and FIG. 4.

As stated above, if a reference text corresponding to each utterance contains errors, a part of statistics for DT is mistakenly accumulated and gives a negative impact. Roughly, 10-30% of the automatically transcribed data still have transcription errors because ASR systems that are used for creating transcriptions cannot necessarily generate perfect recognition texts Accordingly, one embodiment of the present invention may provide a method for improving semi-supervised f-DT in a situation that only a small amount of transcribed data can be available. This is performed by enhancing a discriminative training of a feature-space transform in a semi-supervised fashion, using a small amount of manually transcribed data. This can improve the aforementioned transcription errors.

With reference now to FIGS. 2A to 2D, FIGS. 2A to 2D illustrate one embodiment of a flowchart of a process for discriminatively training a feature-space transform.

A system such as the computer (101) performs each process described in FIGS. 2A to 2D. The system may be implemented as a single computer or plural computers.

Figure 2A:
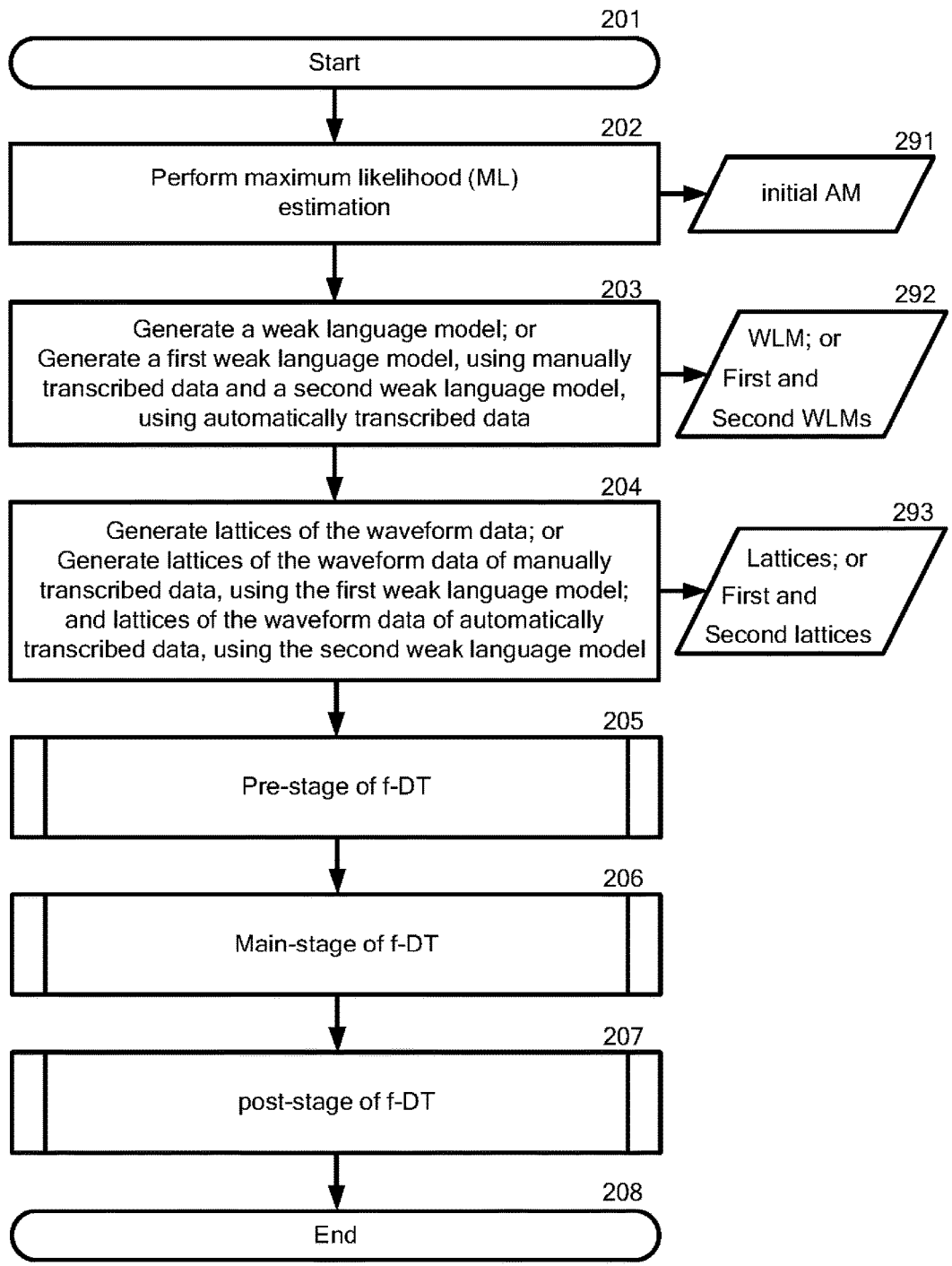
FIG. 2A illustrates one embodiment of a flowchart of an overall process for discriminatively training a feature-space transform.

With reference now to FIG. 2A, FIG. 2A illustrates one embodiment of a flowchart of an overall process for discriminatively training a feature-space transform.

In step 201, the system starts the process for discriminatively training a feature-space transform. The discriminative training is performed for training a hidden Markov model (HMM) model, namely an acoustic model, to distinguish the correct word sequence from other hypotheses.

Prior to the start of step 202 below, the system may prepare two types of training data: one is manually transcribed data and another is automatically transcribed data. The transcribed data refers to wave data and its transcription.

The manually transcribed data may be prepared by manually transcribing utterances, and, therefore, expensive, and consequently these corpora are usually small and sparse. For example, the manually transcribed data may be composed of a few hundred hours (or less hours) data set.

The automatically transcribed data may be prepared by automatically transcribing utterances, using an existing ASR. Accordingly, these corpora are usually large, but often include ASR (transcription) errors. For example, the automatically transcribed data may be composed of several thousand or more hours a data set. The automatically transcribed data may further comprise a small amount of the manually transcribed data mentioned above. Please note that it may possible that the automatically transcribed data may be prepared just prior to the start of the step 222 described in FIG. 2C.

Further, any time or just prior to the start of step 205, the system may prepare an initialized feature-space transform which will be used in step 205. The feature-space transform may be, for example, feature minimum phone error (fMPE) transform, or feature maximum mutual information (fMMI). In one embodiment, the initialized-space transform may be prepared by setting values in a feature-space transform to zero. The initialized-space transform may be stored in, for example, a transform database.

In step 202, the system performs the maximum likelihood (ML) estimation to estimate AM parameters and, then, obtains an initial acoustic model (AM) (291).

The ML is a typical AM construction techniques. In one embodiment of the preset invention, any method of the ML known to the art can be utilized.

The ML estimation attempts to find the HMM parameter set which maximizes the likelihood of the observed acoustic data given the model. In one embodiment of the preset invention, any method of ML estimation known to the art, for example, the expectation-maximization (EM), can be utilized to estimate AM parameters.

For the ML, automatically transcribed data having, for example, X k-hour data set may be used, where X is one to ten.

In step 203, the system may generate a standard weak language model (WLM) generated with all of the training data using in AM training or a subset of the training data. The WLM is used to generate lattices of the training data for f-DT.

Instead of generating the standard WLM, the system may generate a WLM (292), using manually transcribed data. Hereinafter, the WLM generated using manually transcribed data is also referred to as a first WLM (292).

Further, the system may generate a WLM (292), using automatically transcribed data. Hereinafter, the WLM generated using automatically transcribed data refers is also referred to as second WLM (292). Please note that it may possible that the second WLM (292) may be prepared any time or just prior to the start of the step 222 described in FIG. 2C.

In step 204, the system may generate standard lattices of wave form data, using the standard WLM generated in step 203.

Instead of generating the standard lattices, the system may generate lattices of the waveform data of manually transcribed data, using the first WLM (292). Hereinafter, lattices of the waveform data of manually transcribed data is also referred to as first lattices (293).

Further, the system may further generates lattices of the waveform data of automatically transcribed data (293), using the second WLM (292). Hereinafter, lattices of the waveform data of automatically transcribed data are also referred to as second lattices (293).

In step 205, the system performs a pre-stage of f-DT. The pre-stage of f-DT is newly introduced by one embodiment of the present invention. The details of the pre-stage of f-DT will be explained in more detail below by referring to FIG. 2B below.

In step 206, the system performs a main-stage of f-DT. The details of the main-stage of f-DT will be explained in more detail below by referring to FIG. 2C below.

In step 207, the system performs a post-stage of f-DT. The post-stage of f-DT is newly introduced by one embodiment of the present invention. The details of the post-stage of f-DT will be explained in more detail below by referring to FIG. 2D below.

In step 208, the system terminates the process mentioned above.

After the completion of the process, the system may go to a model-space DT training.

Figure 2B:
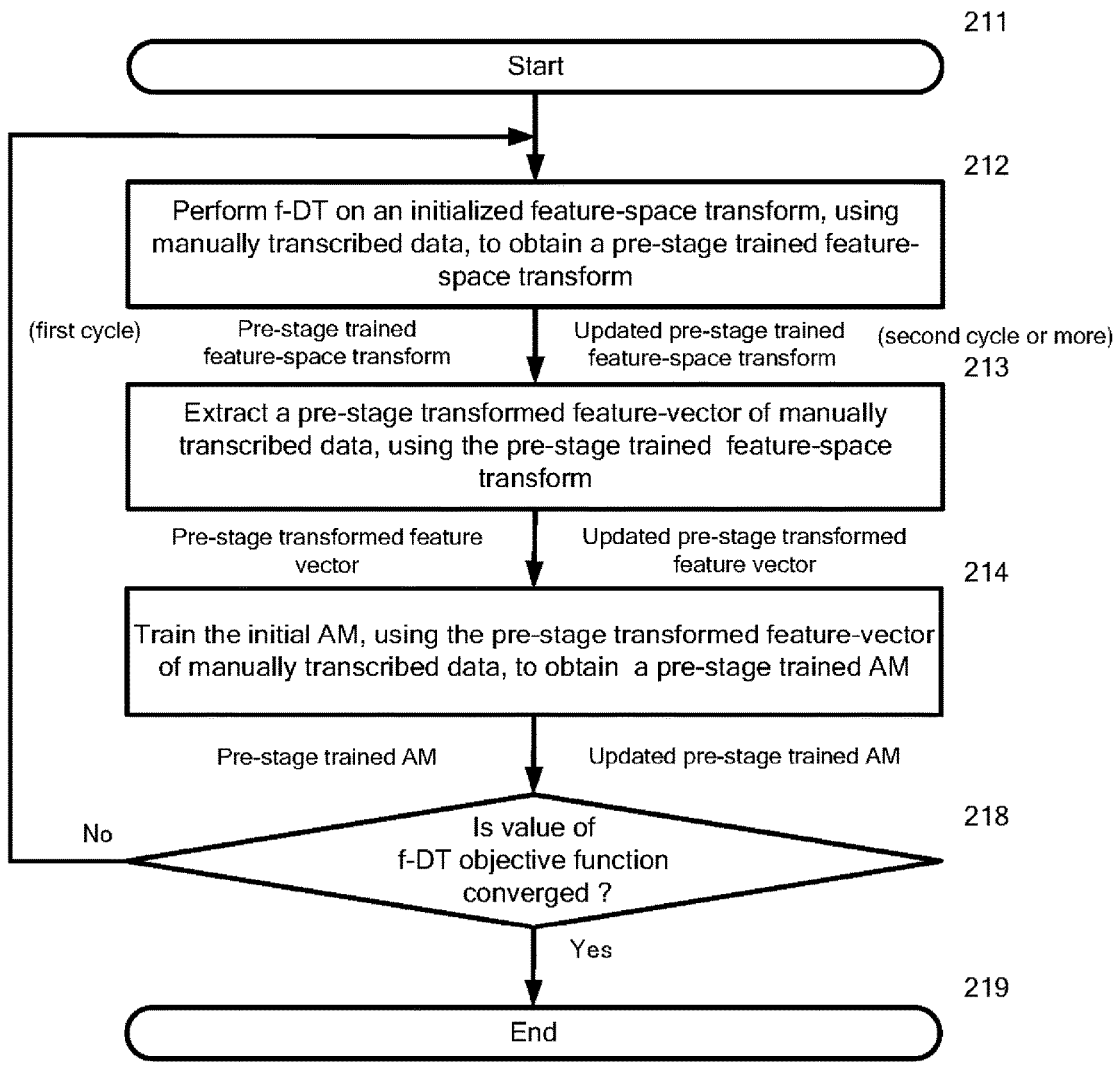
FIG. 2B illustrates one embodiment of a flowchart of a pre-stage of f-DT for discriminatively training a feature-space transform.

With reference now to FIG. 2B, FIG. 2B illustrates one embodiment of a flowchart of the pre-stage of f-DT for discriminatively training a feature-space transform.

In step 211, the system starts a process of the pre-stage of f-DT for discriminatively training a feature-space transform.

In step 212, the system performs f-DT on the initialized feature-space transform, using manually transcribed data, to obtain a pre-stage trained feature-space transform.

For the f-DT on the initialized feature-space transform, manually transcribed data made from, for example, a few hundred hours data set may be used.

The system may utilize the standard WLM and the standard lattices when f-DT on the initialized feature-space transform is performed. Alternatively, if the first WLM (292) and the first lattices (293) are generated, the first WLM (292) and the first lattices (293) are utilized in step 212. The system may perform f-DT on the initialized feature-space transform, using waveform data corresponding to manually transcribed data and the first lattices (293).

In step 213, the system extracts a pre-stage transformed feature-vector of manually transcribed data, using the pre-stage trained feature-space transform obtained from step 212.

In step 214, the system trains the initial AM, or ML-stage AM, using the pre-stage transformed feature-vector of manually transcribed data obtained from step 213, to obtain a pre-stage trained AM.

In step 218, the system judges whether value of f-DT objective function is converged or not. The f-DT objective function, F, may be represented as, for example, the following Equation (1) below, which is cited from Daniel Povey et. al., "fMPE: Discriminatively Trained Features for Speech Recognition", IEEE ICASSP 2005, pp. 961-964, 2005:

$$M'_{ij} = M_{ij} + v_{ij}\frac{\partial F}{\partial M_{ij}}, \tag{1}$$

$$\frac{\partial F}{\partial M_{ij}} = \sum_{t=1}^{T}\frac{\partial F}{\partial y_{ti}}h_{tj} = \sum_{t=1}^{T}\left(\frac{\partial F}{\partial y_{ti}}^{direct} + \frac{\partial F}{\partial y_{ti}}^{indirect}\right)h_{tj}$$

$$\frac{\partial F}{\partial y_{ti}}^{indirect} = \sum_{s=1}^{S}\sum_{m=1}^{M_S}\frac{\gamma_{sm}(t)}{\gamma_{sm}}\left\{\frac{\partial F}{\partial \mu_{smi}} + 2\frac{\partial F}{\partial \sigma_{smi}^{2}}(y_{ti} - \mu_{smi})\right\} \tag{2}$$

where $M_{ij}$ denotes a fMPE transform, $v_{ij}$ is a learning rate, $h_{tj}$ is a j-th component in a posterior vector and denotes a high-dimensional posterior vector, $y_{ti}$ is an i-th component in the feature vector after transformation, and $h_{tj}$, S denotes the number of states, $\gamma_{sm}(t)$ is the ML occupation probability as used in the standard forward-backward training, $\gamma_{sm}$ is the same probability summed over all of the training data, $\mu_{smi}$ is an i-th component of a mean vector in state s and Gaussian m and $\sigma_{smi}$ is a variance.

In Equation (1), the differential term in the equation above is divided into a "direct" differential and an "indirect" differential as described in the right side.

Equation (2) above represents the change of objective function F caused by variations of Gaussian means and variances that are indirectly related to the variation of i-th dimensional transformed feature vector in accordance with the prior art.

If the judgment is positive, the system proceeds with a final step 219 below, and the pre-stage trained feature-space transform and the pre-stage trained AM are output for the next process described in FIG. 2C.

On the other hand, if the judgment is negative, the system returns to the step 212 and repeats the steps 212 to 218 as iteration cycles.

In the step 212 of the second cycle, the pre-stage trained feature-space transform, which being obtained immediately before, will be used and an updated pre-stage trained feature-space transform will be obtained.

In the step 213 of the second cycle, the updated pre-stage trained feature-space transform, which being obtained immediately before, will be used and an updated pre-stage transformed feature-vector of manually transcribed data will be extracted.

The manually transcribed data used in the step 213 may be the same or different that used in the step 212.

In the step 214 of the second cycle, the updated pre-stage transformed feature-vector of manually transcribed data, which being obtained immediately before, will be used and an updated pre-stage trained AM will be obtained.

Figure 2C:
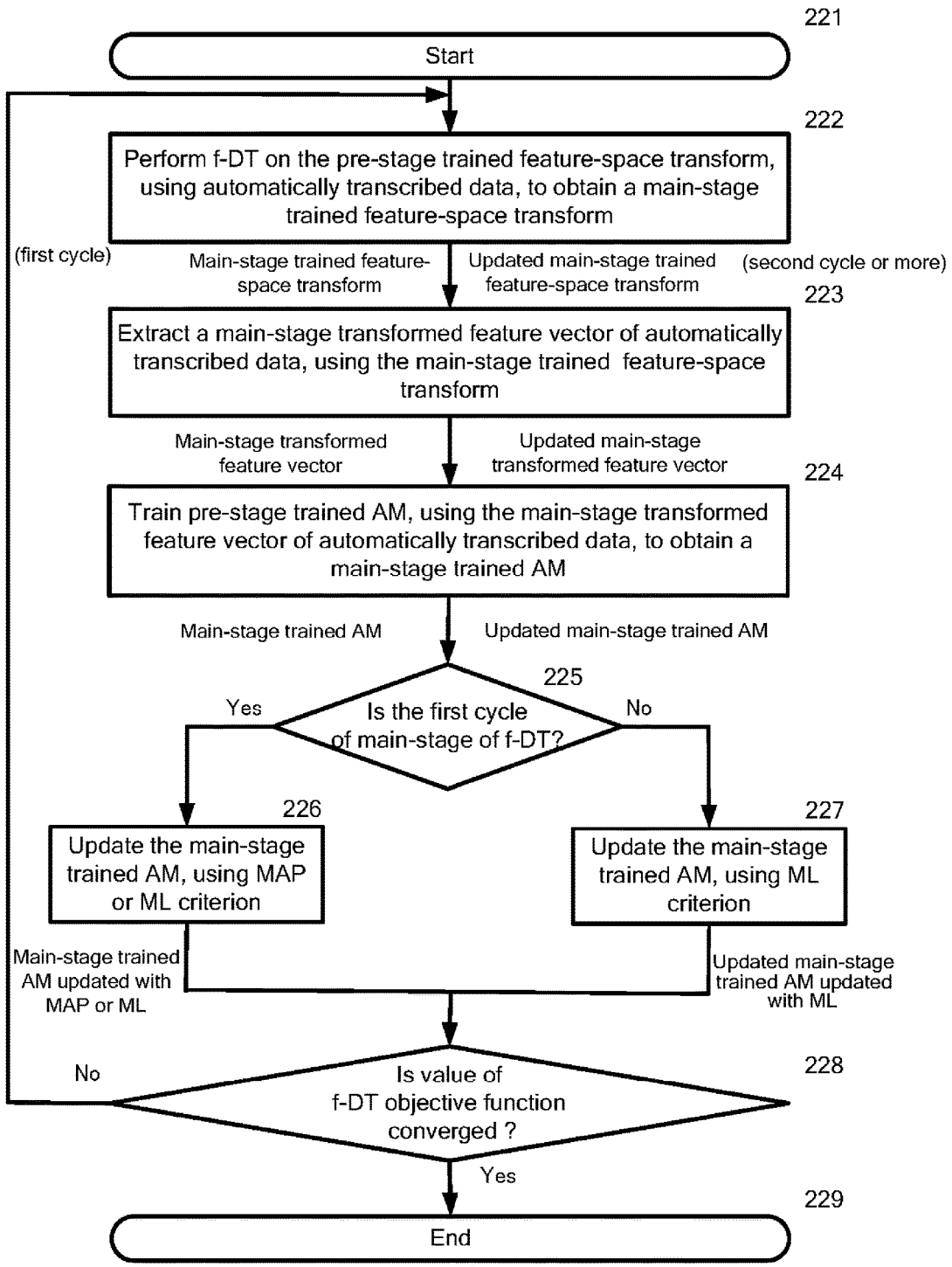
FIG. 2C illustrates one embodiment of a flowchart of a main-stage of f-DT for discriminatively training a feature-space transform.

As a result of the step 218 of the second cycle, if the judgment is positive, the system proceeds with the final step 219, and the updated pre-stage trained feature-space transform and the updated pre-stage trained AM are output as the pre-stage trained feature-space transform and the pre-stage trained AM, respectively, for the next process described in FIG. 2C. On the other hand, if the judgment is negative, the steps 212 to 218 of the third or more cycles will be performed until a result of the step 218 becomes positive.

In step 219, the system terminates the process mentioned above.

In the step 212 above, a regularization process may be performed in order to avoid an over-training caused by data size. The regularization process may be represented as the following Equation (3) below. Equation (3) represents the change of F with a confidence based on a data amount. In Equation (3), new parameter ρ is added to avoid overtraining and, therefore, fMPE training will be controlled.

$$\frac{\partial F}{\partial y_{ti}}^{indirect} = \sum_{s=1}^{S}\sum_{m=1}^{M_s} \frac{\gamma_{sm}(t)}{\gamma_{sm}} \left\{ \frac{\partial F}{\partial \mu_{smi}} + 2\frac{\partial F}{\partial \sigma_{smi}^2}(y_{ti} - \mu_{smi}) \right\} \cdot \rho(\gamma_{sm}^{num}, \gamma_{sm}^{den}) \quad (3)$$

where $M_s$ denotes the number of Gaussians in the states, $\gamma_{smi}^{num}$ and $\gamma_{smi}^{den}$ relate to training data size (number of frames) in a state s, and Gaussian m and respectively denote MPE statistics on numerator and denominator lattices, and $\rho(\gamma_{sm}^{num},\gamma_{sm}^{den})$ is the regularization term ranging from 0 to 1.

This function $\rho(\gamma_{sm}^{num},\gamma_{sm}^{den})$ takes zero when $\gamma_{sm}^{num}$, $\gamma_{sm}^{den}$ are small. Thus, the regularization term takes a small value as a penalty when there is no sufficient training data for the Gaussian As a result of the pre-stage of f-DT, the pre-stage trained feature-space transform and the pre-stage trained AM which are obtained as the output of the pre-stage of f-DT may be insufficient in terms of robustness (for example, acoustical and speaker's variations) due to the size of manually transcribed data size. Accordingly, the pre-stage trained feature-space transform and the pre-stage trained AM as the output of the pre-stage of f-DT will be used as an initial value of the next stage, namely the main-stage, of f-DT.

With reference now to FIG. 2C, FIG. 2C illustrates one embodiment of a flowchart of the main-stage of f-DT for discriminatively training a feature-space transform.

In step 221, the system starts a process of the main-stage of f-DT for discriminatively training a feature-space transform.

In step 222, the system performs f-DT on the pre-stage trained feature-space transform obtained from the previous process described in FIG. 2B as the output, using automatically transcribed data, to obtain a main-stage trained feature-space transform.

For the f-DT on the pre-stage trained feature-space transform, automatically transcribed data having, for example, X k-hour data set may be used, where X is one to ten.

The system may utilize the standard WLM and the standard lattices when f-DT on the pre-stage trained feature-space transform is performed. Alternatively, if the second WLM (292) and the second lattices (293) are generated, the second WLM (292) and the second lattices (293) are utilized in step 222. The system may perform f-DT on pre-stage trained feature-space transform obtained from the previous process described in FIG. 2B as the output, using waveform data corresponding to automatically transcribed data and the second lattices (293).

In step 223, the system extracts a main-stage transformed feature-vector of automatically transcribed data, using the main-stage trained feature-space transform obtained from step 222.

The automatically transcribed data used in the step 223 may be the same or different that used in the step 222.

In step 224, the system trains the pre-stage trained AM obtained from the previous process described in FIG. 2B as the output, using the main-stage transformed feature-vector of automatically transcribed data obtained from step 223, to obtain a main-stage trained AM.

In step 225, the system judges whether the process is the first cycle of the main-stage of f-DT or not. If the number of cycle is the first cycle of the main-stage of f-DT, the judgment is positive. Accordingly, the system proceeds with a step 226 below.

In step 226, the system updates the main-stage trained AM obtained from the step 224 immediately before, using the Maximum A Posteriori (MAP) criterion or the ML criterion, to obtain a main-stage trained AM updated with MAP or ML. It should be noted that the MAP criterion is used only in the first cycle of the main-stage of f-DT and the ML may be used in the second cycle or later instead of the MAP criterion which is used in the first cycle.

The MAP criterion is a typical AM adaptation techniques. In one embodiment of the preset invention, any method of the MAP criterion known to the art can be utilized.

The reason for updating the AM with MAP criterion is that feature-space transform of each of the pre-stage of f-DT and main-stage of f-DT critically differs each other due to the difference of the data size between manually transcribed data and automatically transcribed data which are used in the pre-stage of f-DT and main-stage of f-DT, respectively.

In step 228, the system judges whether value of the f-DT objective function above is converged or not. If the judgment is positive, the system proceeds with a final step 229 below, and the main-stage trained feature-space transform and the main-stage trained AM updated with MAP or ML are output for the next process described in FIG. 2D.

On the other hand, if the judgment is negative, the system returns to the step 222 and repeats the steps 222 to 228 as a second cycle.

In the step 222 of the second cycle, the main-stage trained feature-space transform, which being obtained immediately before, will be used and an updated main-stage trained feature-space transform will be obtained.

In the step 223 of the second cycle, the updated main-stage trained feature-space transform, which being obtained immediately before, will be used and an updated main-stage transformed feature-vector of automatically transcribed data will be extracted.

In the step 224 of the second cycle, the updated main-stage transformed feature-vector of automatically transcribed data, which being obtained immediately before, will be used and an updated main-stage trained AM will be obtained.

In the step 225 of the second cycle, the system judges whether the process is the first cycle of the main-stage f-DT or not. If the number of cycle is the second cycle of the main-stage of f-DT, the judgment is negative. Accordingly, the system proceeds with a step 227 below.

In step 227, the system updates the updated main-stage trained AM obtained from the step 224 immediately before, using the ML criterion, to obtain an updated main-stage trained AM updated with ML.

Figure 2D:
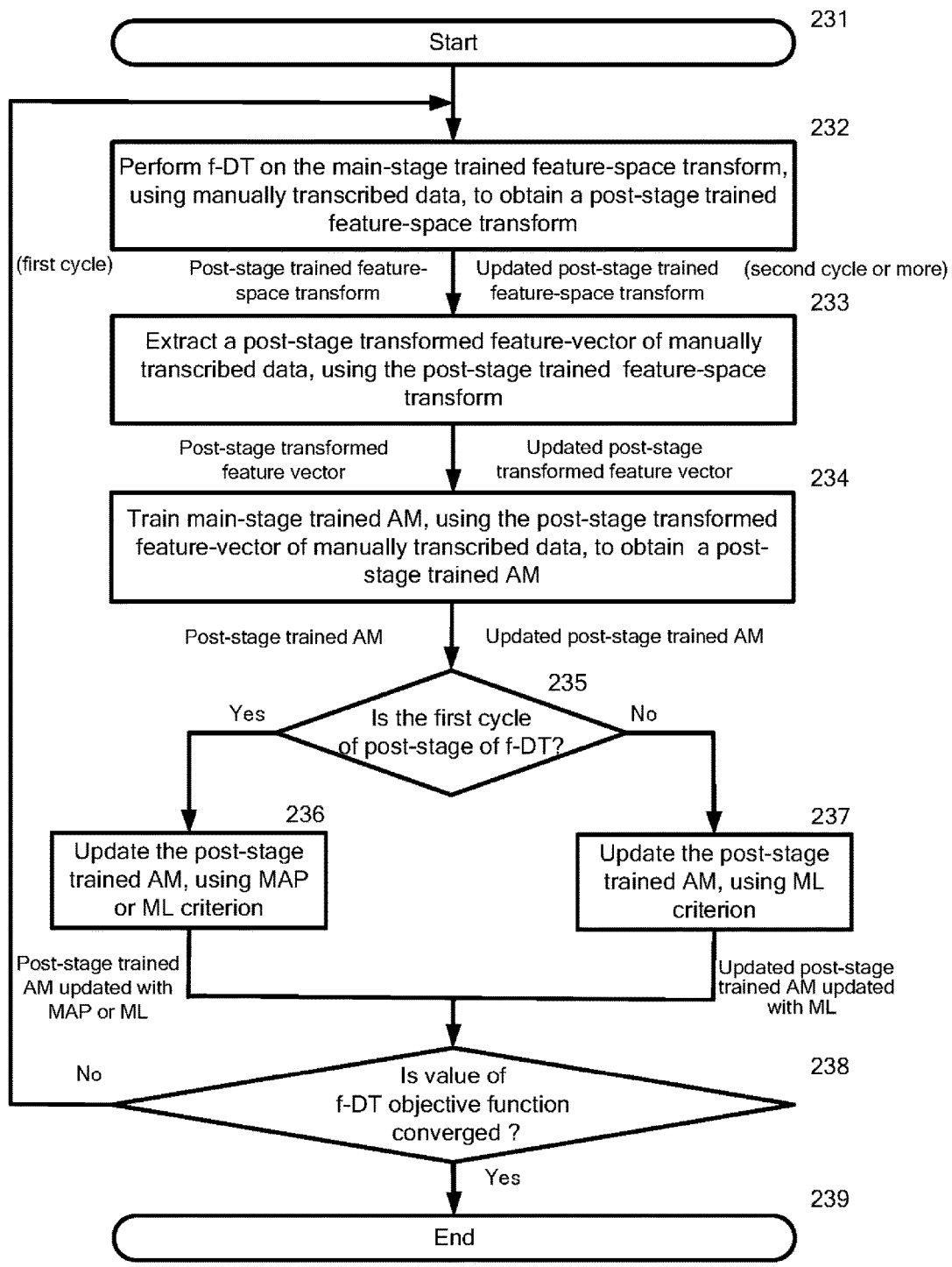
FIG. 2D illustrates one embodiment of a flowchart of a post-stage of f-DT for discriminatively training a feature-space transform.

As a result of the step 228 of the second cycle, if the judgment is positive, the system proceeds with the final step 229, and the updated main-stage trained feature-space transform and the updated main-stage trained AM updated with ML are output as the main-stage trained feature-space transform and the main-stage trained AM, respectively, for the next process described in FIG. 2D. On the other hand, if the judgment is negative, the steps 212 to 218 of the third cycles or more will be performed until a result of step 228 becomes positive.

In step 229, the system terminates the process mentioned above.

As a result of the main-stage of f-DT, the main-stage trained feature-space transform and the main-stage trained AM which are obtained as the output of the main-stage of f-DT are improved in term of robustness due to the size of automatically transcribed data size. However, the main-stage of f-DT may slightly leads the feature-space transform and the AM in the wrong direction because automatically transcribed data includes transcription errors. Accordingly, the main-stage trained feature-space transform and the main-stage trained AM as the output of the main-stage of f-DT will be used as an initial value of the next stage, namely the post-stage, of f-DT.

With reference now to FIG. 2D, FIG. 2D illustrates one embodiment of a flowchart of the post-stage of f-DT for discriminatively training a feature-space transform.

In step 231, the system starts a process of the post-stage of f-DT for discriminatively training a feature-space transform.

In step 232, the system performs f-DT on the main-stage trained feature-space transform obtained from the previous process described in FIG. 2C as the output, using manually transcribed data, to obtain a post-stage trained feature-space transform.

The manually transcribed data used in the step 232 may be the same or different that used in the step 212 described in FIG. 2B.

The system may utilize the standard WLM and the standard lattices when f-DT on the main-stage trained feature-space transform is performed. Alternatively, if first WLM (292) and the first lattices (293) are generated, the first WLM (292) and the first lattices (293) are utilized in step 232. The system may perform f-DT on the initialized feature-space transform obtained from the previous process described in FIG. 2C as the output, using waveform data corresponding to manually transcribed data and the first lattices (293).

In step 233, the system extracts a post-stage transformed feature-vector of manually transcribed data, using the post-stage trained feature-space transform obtained from step 232.

The manually transcribed data used in the step 233 may be the same or different that used in the step 213 described in FIG. 2B and that used in the step 232.

In step 234, the system trains the main-stage trained AM obtained from the previous process described in FIG. 2C as the output, using the post-stage transformed feature-vector of manually transcribed data obtained from step 233, to obtain a post-stage trained AM.

In step 235, the system judges whether the process is the first cycle of the post-stage of f-DT or not. In the case of the first cycle of the post stage of f-DT, the judgment is positive. Accordingly, the system proceeds with a step 236 below.

In step 236, the system updates the post-stage trained AM obtained from the step 234 immediately before, using the MAP criterion or the ML criterion, to obtain a post-stage trained AM updated with MAP or ML. It should be noted that the MAP criterion is used only in the first cycle of the post-stage of f-DT and the ML criterion may be used in the first cycle instead of the MAP criterion.

The reason for updating the AM with MAP criterion is that feature-space transform of each of the main-stage of f-DT and the post-stage of f-DT critically differ each other due to the difference of the data size between automatically transcribed data and manually transcribed data which are used in the main-stage of f-DT and post-stage of f-DT, respectively.

In step 238, the system judges whether value of the f-DT objective function above is converged or not. If the judgment is positive, the system proceeds with a final step 239 below, and the post-stage trained feature-space transform and the post-stage trained AM updated with MAP or ML are output for the model-space DT training.

On the other hand, if the judgment is negative, the system returns to the step 232 and repeats the steps 232 to 238 as a second cycle.

In the step 232 of the second cycle, the post-stage trained feature-space transform, which being obtained immediately before, will be used and an updated post-stage trained feature-space transform will be obtained.

In the step 233 of the second cycle, the updated post-stage trained feature-space transform, which being obtained immediately before, will be used and an updated post-stage transformed feature-vector of manually transcribed data will be extracted.

In the step 234 of the second cycle, the updated post-stage transformed feature-vector of manually transcribed data, which being obtained immediately before, will be used and an updated post-stage trained AM will be obtained.

In the step 235 of the second cycle, the system judges whether the process is the first cycle of the post-stage of f-DT or not. If the number of cycle is the second cycle of the post-stage of f-DT, the judgment is negative. Accordingly, the system proceeds with a step 237 below.

In the step 237, the system updates the updated post-stage trained AM obtained from the step 234 immediately before, using the ML criterion, to obtain an updated post-stage trained AM updated with ML.

As the result of the step 238 of the second cycle, if the judgment is positive, the system proceeds with the final step 239, and the updated post-stage trained feature-space transform and the updated post-stage trained AM updated with ML are output as the post-stage trained feature-space transform and the post-stage trained AM, respectively, for the model-space DT training. On the other hand, if the judgment is negative, the steps 212 to 218 of the third cycles or more will be performed until a result of step 238 becomes positive.

In step 239, the system terminates the process mentioned above.

In the post-stage of f-DT, the regularization process may be performed in order to avoid an over-training caused by data size, as similarly stated in the pre-stage of f-DT.

As a result of the post-stage of f-DT, the post-stage trained feature-space transform and the post-stage trained AM which are obtained as the output of the post-stage of f-DT can be improved or refined.

In an embodiment of the present invention, the pre- and post-stages are added before and after the main-stage of f-DT. Thus, an embodiment of the present invention has three process of performing f-DT: that is pre-, main- and post-stages of f-DT. Accordingly, an embodiment of the present invention provides a technique for improving semi-supervised f-DT in a situation that only small amount of manually transcribed is available.

With reference now to FIG. 3, FIG. 3 illustrates ASR experiment results.

5 K hours of utterances were prepared.

In the following Experiments 1 and 2, 5 K hours of automatically transcribed data including 150 hours of manually transcribed data, and 150 hours of manually transcribed data were used.

5 K hours of automatically transcribed data including 150 hours of manually transcribed data was prepared by the following: dividing 5 K hours of utterances into two parts by manually or automatically: one is 4850 hours of utterances and another is 150 hours of utterances; 4850 hours of automatically transcribed data was prepared by automatically transcribing the 4850 hours utterances, using the existing ASR; 0.150 hours of manually transcribed data was prepared by manually transcribing the 150 hours utterances; and, then, combining 4850 hours of automatically transcribed data with 150 hours of manually transcribed data to obtain 5 K hours of automatically transcribed data including 150 hours of manually transcribed data.

As mentioned above, 150 hours of manually transcribed data was prepared by manually transcribing the 150 hours utterances.

Experiment-1:

For Experiment A, 5 K hours of automatically transcribed data including 150 hours of manually transcribed data was used for performing a conventional f-DT.

For Experiment B, 150 hours of manually transcribed data was used for performing the pre-stage of f-DT, according to one embodiment described in FIG. 2B, and 5 K hours of automatically transcribed data including 150 hours of manually transcribed data, which was also used in Experiment A, was used for performing the main-stage of f-DT, according to one embodiment described in FIG. 2C, without MAP and ML update, and 150 hours of manually transcribed data used in the pre-stage of f-DT was also used for performing the post stage of f-DT according to one embodiment of the present invention described in FIG. 2D, without MAP and ML update.

For Experiment C, 150 hours of manually transcribed data, which was used in the pre-stage of f-DT in Experiment B, was used for performing the pre-stage of f-DT, according to one embodiment described in FIG. 2B, and 5 K hours of automatically transcribed data including 150 hours of manually transcribed data, which was used in the main-stage of f-DT in Experiment B, was also used for performing the main-stage of f-DT, according to one embodiment described in FIG. 2C, with MAP and ML update, and 150 hours of manually transcribed data used in the post-stage of f-DT in Experiment C was also used for performing the post stage of f-DT according to one embodiment of the present invention described in FIG. 2D, with MAP and ML.

The upper table (301) shows the results of improving rate (%) of Experiments A to C. The improving rate (%) each shown in the results of Experiments B and C was calculated using the value of Experiment A as a baseline. As can be seen in the result of Experiment B, largely improved rate was observed in the average result. Further, as can be seen in Experiment C, further improved rate was observed in the average result, compared to that of Experiment B.

Accordingly, as seen the upper table (301), an embodiment of the present invention provides a technique for improving semi-supervised f-DT in a situation that only small amount of manually transcribed is available.

Experiment-2:

For each of Experiments D and E, 5 K hours of transcribed data including 150 hours of manually transcribed data mentioned above was used for performing a conventional f-DT. For Experiment D, 5 K hours of transcribed data including 150 hours of manually transcribed data mentioned above was further used for training data of WLM and the trained WLM was used in the conventional f-DT. For Experiment E, 150 hours of manually transcribed data mentioned above was used for training data of WLM and the trained WLM was used in the conventional f-DT.

For each of Experiments F and G, 150 hours of manually transcribed mentioned above was used for performing the pre-stage of f-DT, according to one embodiment described in FIG. 2B, and 5 K hours of automatically transcribed data including 150 hours of manually transcribed data mentioned above was used for performing the main-stage of f-DT, according to one embodiment described in FIG. 2C, without MAP and ML update, and 150 hours of manually transcribed data was used for performing the post stage of f-DT, according to one embodiment described in FIG. 2D, with ML update. For Experiment F, 5 K hours of automatically transcribed data including 150 hours of manually transcribed data mentioned above was used for training data of WLM (see step 203 of FIG. 2A) and the trained WLM was used in the pre-, main-, and post-stages of f-DT according to one embodiment of the present invention. For Experiment G, 150 hours of manually transcribed data mentioned above was used for training data (see step 203 of FIG. 2A) of WLM and the trained WLM was used in the pre-, main-, and post-stages of f-DT according to one embodiment of the present invention.

The lower table (311) shows the results of improving rate (%) of Experiments D to G. The improving rate (%) each shown in the results of Experiments E was calculated using the value of Experiment D as a baseline. The improving rate (%) each shown in the results of Experiments G was calculated using the value of Experiment F as a baseline. As can be seen in the results of Experiments D and E, when the manually transcribed data is used for training the WLM, improved rate was observed in the average results. Also, as can be seen in the results of Experiments F and G, when the manually transcribed data is used for training the WLM, improved rate was observed in the average results.

Accordingly, it is useful to construct a WLM only with manually transcribed data and use the WLM for generating lattices which are used for pre-, main-, and post-stages of f-DT.

Figure 4:
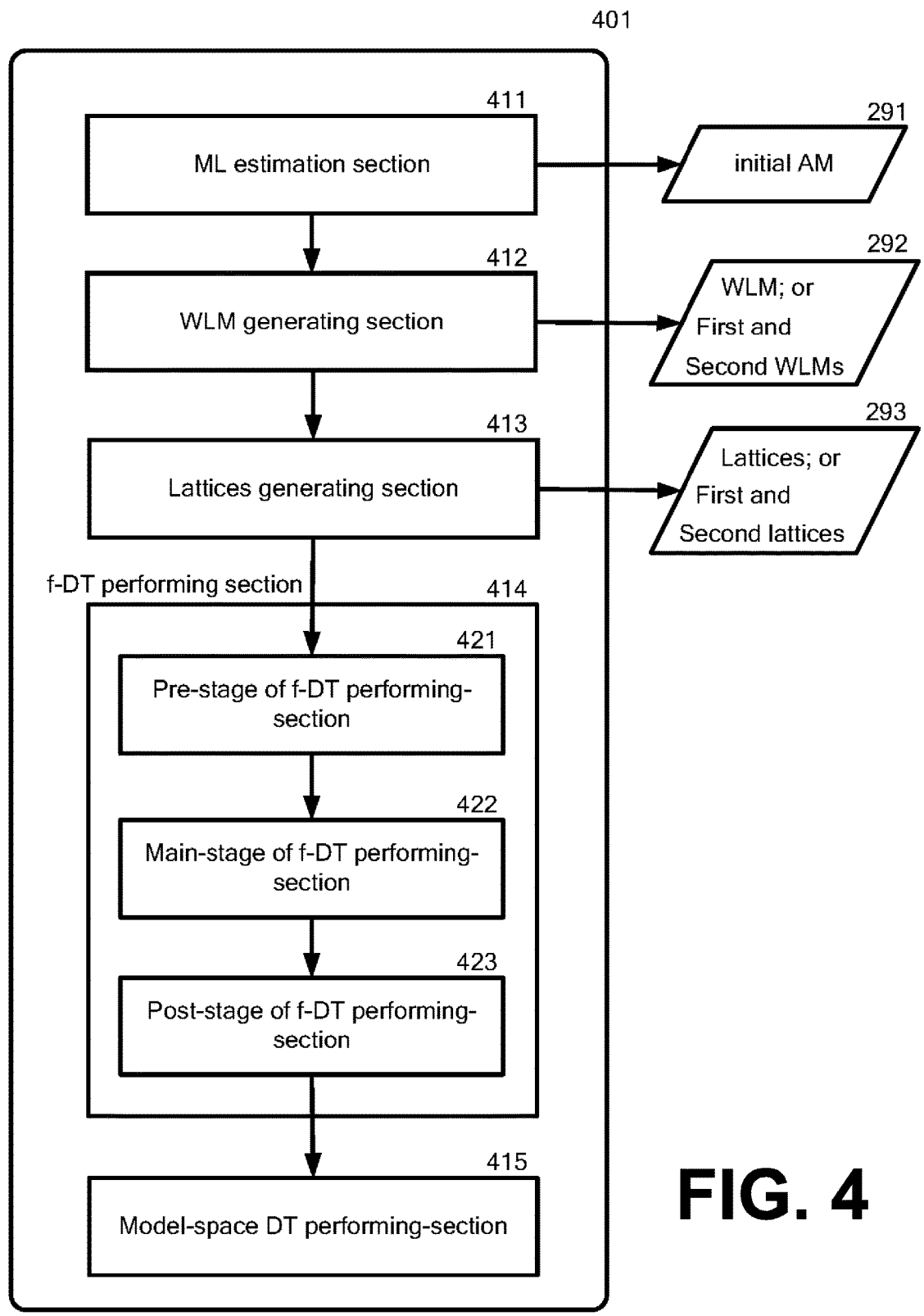
FIG. 4 illustrates one embodiment of an overall functional block diagram of a system hardware used in an embodiment of the present invention.

With reference now to FIG. 4, FIG. 4 illustrates one embodiment of an overall functional block diagram of a system hardware used in accordance with the embodiment of the flowcharts described in FIGS. 2A to 2D.

The system (401) may correspond to the computer (101) described in FIG. 1.

The system (401) comprises a ML estimation section (411), a WLM generating section (412), a lattices generating section (413), an f-DT performing section (414) and a model-space DT performing-section (415).

The ML estimation section (411) may perform ML estimation to estimate AM parameters and, then, obtains an initial AM (291).

The ML estimation section (411) may perform step 202 described in FIG. 2A.

The WLM generating section (412) may generate a standard WLM mentioned above.

The WLM generating section (412) may generate a WLM, using manually transcribed data, to obtain the first WLM (292). Further, the WLM generating section (412) may generate a WLM, using automatically transcribed data, to obtain the second WLM (292).

The WLM generating section (412) may perform step 203 described in FIG. 2A.

The lattices generating section (413) may generate standard lattices, using the standard WLM.

The lattices generating section (413) may generate lattices of the waveform data of manually transcribed data (namely, the first lattices (293)), using the WLM. Further, the lattices generating section (413) may generate lattices of the waveform data of automatically transcribed data (namely, the second lattices (293)), using the WLM.

The lattices generating section (413) may perform step 204 described in FIG. 2A.

The f-DT performing section (414) comprises a pre-stage of f-DT performing-section (421), a main-stage of f-DT performing-section (422) and a post-stage of f-DT performing-section (423).

The pre-stage of f-DT performing-section (421) may perform f-DT on an initialized feature-space transform, using manually transcribed data, to obtain a pre-stage trained feature-space transform. The pre-stage of f-DT performing-section (421) may extract a pre-stage transformed feature vector of manually transcribed data, using the pre-stage trained feature-space transform; and train an initial AM, using the pre-stage transformed feature vector of manually transcribed data, to obtain a pre-stage trained AM. Until convergence of an objective function is attained, the pre-stage of f-DT performing-section (421) may repeat the following: performing f-DT on the pre-stage trained feature-space transform obtained immediately before, using manually transcribed data, to obtain an updated pre-stage-trained feature-space transform, extracting an updated pre-stage transformed feature vector of manually transcribed data, using the updated pre-stage trained feature-space transform obtained immediately before, and training the pre-stage AM obtained immediately before, using the updated pre-stage transformed feature vector of manually transcribed data, to obtain an updated pre-stage trained AM. Further, the pre-stage of f-DT performing-section (421) may perform the pre-stage of f-DT, according to the regularization process.

The pre-stage of f-DT performing-section (421) may perform step 205 described in FIG. 2A and the steps described in FIG. 2B.

The main-stage of f-DT performing-section (422) may perform f-DT on the pre-stage trained feature-space transform as a newly initialized feature-space transform, using automatically transcribed data, to obtain a main-stage trained feature-space transform. The main-stage of f-DT performing-section (422) may extract a main-stage transformed feature vector of automatically transcribed data, using the main-stage trained feature-space transform; and train the pre-stage trained AM, using the main-stage transformed feature vector of automatically transcribed data, to obtain a main-stage trained AM. Until convergence of an objective function is attained, the main-stage of f-DT performing-section (422) may repeat the following: performing f-DT on the main-stage trained feature-space transform obtained immediately before, using automatically transcribed data, to obtain an updated main-stage trained feature-space transform, extracting an updated main-stage transformed feature vector of automatically transcribed data, using the updated main-stage trained feature-space transform obtained immediately before, and training the main-stage AM obtained immediately before, using the updated main-stage transformed feature vector of automatically transcribed data, to obtain an updated main-stage trained AM.

The main-stage of f-DT performing-section (422) may perform step 206 described in FIG. 2A and the steps described in FIG. 2C.

The post-stage of f-DT performing-section (423) may perform f-DT on the main-stage trained feature-space transform as a newly initialized feature-space transform, using manually transcribed data, to obtain a post-stage trained feature-space transform. The post-stage of f-DT performing-section (423) may extract a post-stage transformed feature vector of manually transcribed data, using the post-stage trained feature-space transform; and train the main-stage trained AM, using the post-stage transformed feature vector of manually transcribed data, to obtain a post-stage trained AM. Until convergence of an objective function is attained, the post-stage of f-DT performing-section (423) may repeat the following: performing f-DT on the post-stage trained feature-space transform obtained immediately before, using manually transcribed data, to obtain an updated post-stage-trained feature-space transform, extracting an updated post-stage transformed feature vector of manually transcribed data, using the updated pre-stage trained feature-space transform obtained immediately before, and training the post-stage AM obtained immediately before, using the updated post-stage transformed feature vector of manually transcribed data, to obtain an updated post-stage trained AM. Further, the post-stage of f-DT performing-section (423) may perform the post-stage of f-DT, according to the regularization process.

The post-stage of f-DT performing-section (423) may perform step 207 described in FIG. 2A and the steps described in FIG. 2D.

The model-space DT performing-section (415) may perform a model-space DT training.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The expression "comprise(s)/comprising a/one" should be understood as "comprise(s)/comprising at least one".

The expression "comprise(s)/comprising" should be understood as "comprise(s)/comprising at least".

The expression "/" should be understood as "and/or".

What is claimed is:

1. A method for automatic speech recognition (ASR) by discriminatively training a feature-space transform, the method comprising:
    performing a first acoustic model (AM) training using manually transcribed data by implementing feature-space discriminative training (f-DT) on an initialized feature-space transform to obtain a pre-stage trained feature-space transform;
    performing a second AM training using automatically transcribed data by implementing f-DT on the pre-stage trained feature-space transform as a newly initialized feature-space transform to obtain a main-stage trained feature-space transform;
    performing a third AM training using manually transcribed data by implementing f-DT on the main-stage trained feature-space transform as a newly initialized feature-space transform to obtain a post-stage trained feature-space transform;
    generating a post-stage trained AM from the post-stage trained feature-space transform for converting acoustic data to transcribed data; and
    transcribing acoustic data using the post-stage trained AM.

2. The method according to claim 1, the method further comprising:
    extracting a pre-stage transformed feature vector of manually transcribed data, using the pre-stage trained feature-space transform; and
    training an initial AM, using the pre-stage transformed feature vector of manually transcribed data, to obtain a pre-stage trained AM.

3. The method according to claim 2, the method further comprising:
    extracting a main-stage transformed feature vector of automatically transcribed data, using the main-stage trained feature-space transform; and
    training the pre-stage trained AM, using the main-stage transformed feature vector of automatically transcribed data, to obtain a main-stage trained AM.

4. The method according to claim 3, the method further comprising:
    extracting a post-stage transformed feature vector of manually transcribed data, using the post-stage trained feature-space transform; and
    training the main-stage trained AM, using the post-stage transformed feature vector of manually transcribed data, to obtain post-stage trained AM.

5. The method according to claim 4, the method further comprising updating the post-stage trained AM, using a Maximum A Posteriori (MAP) criterion or a Maximum Likelihood (ML) criterion.

6. The method according to claim 5, the method further comprising repeating, until convergence of an objective function is attained:
    performing f-DT on the post-stage trained feature-space transform obtained immediately before, using manually transcribed data, to obtain an updated post-stage-trained feature-space transform;
    extracting an updated post-stage transformed feature vector of manually transcribed data, using the updated pre-stage trained feature-space transform obtained immediately before; and
    training the post-stage AM obtained immediately before, using the updated post-stage transformed feature vector of manually transcribed data, to obtain an updated post-stage trained AM.

7. The method according to claim 6 the repeating further comprising updating the updated post-stage trained AM, using the Maximum Likelihood (ML) criterion.

8. The method according to claim 3, the method further comprising updating the main-stage trained AM, using a Maximum A Posteriori (MAP) criterion or a Maximum Likelihood (ML) criterion.

9. The method according to claim 8, the method further comprising repeating, until convergence of an objective function is attained:
    performing f-DT on the main-stage trained feature-space transform obtained immediately before, using automatically transcribed data, to obtain an updated main-stage trained feature-space transform;
    extracting an updated main-stage transformed feature vector of automatically transcribed data, using the updated main-stage trained feature-space transform obtained immediately before; and
    training the main-stage AM obtained immediately before, using the updated main-stage transformed feature vector of automatically transcribed data, to obtain an updated main-stage trained AM.

10. The method according to claim 9, the repeating further comprising updating the updated main-stage trained AM, using the Maximum Likelihood (ML) criterion.

11. The method according to claim 2, the method further comprising repeating, until convergence of an objective function is attained:
    performing f-DT on the pre-stage trained feature-space transform obtained immediately before, using manually transcribed data, to obtain an updated pre-stage-trained feature-space transform;
    extracting an updated pre-stage transformed feature vector of manually transcribed data, using the updated pre-stage trained feature-space transform obtained immediately before; and
    training the pre-stage AM obtained immediately before, using the updated pre-stage transformed feature vector of manually transcribed data, to obtain an updated pre-stage trained AM.

12. The method according to claim 1, the method further comprising:
    generating a weak language model, using manually transcribed data; and
    generating lattices of waveform data of the manually transcribed data, using the weak language model, and
    wherein performing f-DT on the initialized feature-space transform is performed using waveform data corresponding to manually transcribed data and the lattices of the waveform data of manually transcribed data.

13. The method according to claim 1, the method further comprising:
    generating a weak language model, using automatically transcribed data; and
    generating lattices of the waveform data of automatically transcribed data, using the weak language model, and
    wherein performing f-DT on the pre-stage trained feature-space transform is performed using waveform data corresponding to automatically transcribed data and the lattices of the waveform data of automatically transcribed data.

14. The method according to claim 1, the method further comprising:
    generating a weak language model, using manually transcribed data; and
    generating lattices of the waveform data of manually transcribed data, using the weak language model, and
    wherein performing f-DT on the main-stage trained feature-space transform is performed using waveform data corresponding to manually transcribed data and the lattices of the waveform data of manually transcribed data.

15. The method according to claim 1, wherein performing f-DT on the initialized feature-space transform and/or performing f-DT on the main-stage trained feature-space transform is performed according to a regularization process.

16. The method according to claim 1, wherein the manually transcribed data is also used to perform f-DT on the pre-stage trained feature-space transform.

17. A system for automatic speech recognition (ASR), comprising:
    a processor; and
    a memory storing a program, which, when executed on the processor, performs an operation for discriminatively training a feature-space transform, the operation comprising:
        performing a first acoustic model (AM) training using manually transcribed data by implementing feature-space discriminative training (f-DT) on an initialized feature-space transform to obtain a pre-stage trained feature-space transform;
        performing a second AM training using automatically transcribed data by implementing f-DT on the pre-stage trained feature-space transform as a newly initialized feature-space transform to obtain a main-stage trained feature-space transform;
        performing a third AM training using manually transcribed data by implementing f-DT on the main-stage trained feature-space transform as a newly initialized feature-space transform to obtain a post-stage trained feature-space transform;

generating, using the processor, a post-stage trained AM from the post-stage trained feature-space transform for converting acoustic data to transcribed data; and transcribing acoustic data using the post-stage trained AM.

18. The system according to claim 17, the operation further comprising at least one of (1) to (3):

(1) extracting a pre-stage transformed feature vector of manually transcribed data, using the pre-stage trained feature-space transform; and training an initial AM, using the pre-stage transformed feature vector of manually transcribed data, to obtain a pre-stage trained AM;

(2) extracting a main-stage transformed feature vector of automatically transcribed data, using the main-stage trained feature-space transform; and training the pre-stage trained AM, using the main-stage transformed feature vector of automatically transcribed data, to obtain a main-stage trained AM; and (3) extracting a post-stage transformed feature vector of manually transcribed data, using the post-stage trained feature-space transform; and training the main-stage trained AM, using the post-stage transformed feature vector of manually transcribed data, to obtain the post-stage trained AM.

19. A computer program product for automatic speech recognition (ASR) by discriminatively training a feature-space transform, the computer program product comprising a computer readable storage medium having program instructions embodied therewith, wherein the computer readable storage medium is not a transitory signal per se, the program instructions executable by a computer to cause the computer to perform a method comprising:

performing a first acoustic model (AM) training using manually transcribed data by implementing feature-space discriminative training (f-DT) on an initialized feature-space transform to obtain a pre-stage trained feature-space transform;

performing a second AM training using automatically transcribed data by implementing f-DT on the pre-stage trained feature-space transform as a newly initialized feature-space transform to obtain a main-stage trained feature-space transform;

performing a third AM training using manually transcribed data by implementing f-DT on the main-stage trained feature-space transform as a newly initialized feature-space transform to obtain a post-stage trained feature-space transform;

generating a post-stage trained AM from the post-stage trained feature-space transform for converting acoustic data to transcribed data; and transcribing acoustic data using the post-stage trained AM.

20. The computer program product according to claim 19, the method further comprising at least one of (1) to (3):

(1) extracting a pre-stage transformed feature vector of manually transcribed data, using the pre-stage trained feature-space transform; and training an initial AM, using the pre-stage transformed feature vector of manually transcribed data, to obtain a pre-stage trained AM;

(2) extracting a main-stage transformed feature vector of automatically transcribed data, using the main-stage trained feature-space transform; and training the pre-stage trained AM, using the main-stage transformed feature vector of automatically transcribed data, to obtain a main-stage trained AM; and (3) extracting a post-stage transformed feature vector of manually transcribed data, using the post-stage trained feature-space transform; and training the main-stage trained AM, using the post-stage transformed feature vector of manually transcribed data, to obtain the post-stage trained AM.

* * * * *